INVENTORS
WALTER L. HERMES
BY CHARLES JONES

William V. Cbs
ATTORNEY

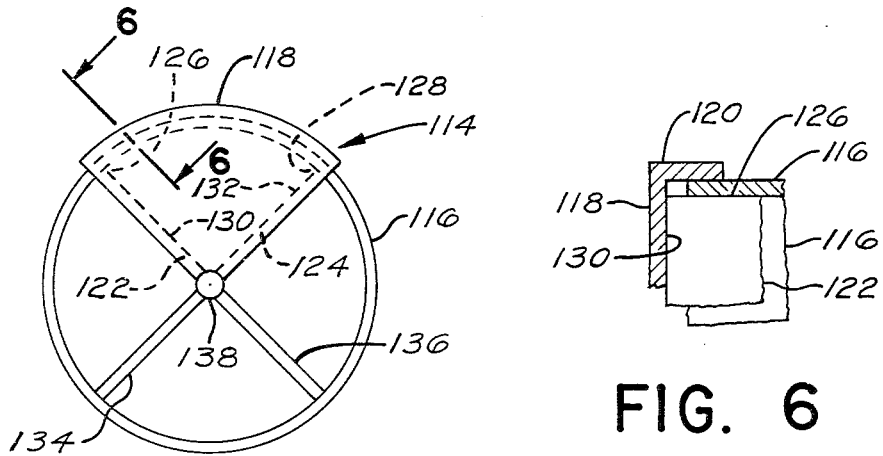
FIG. 5
FIG. 6
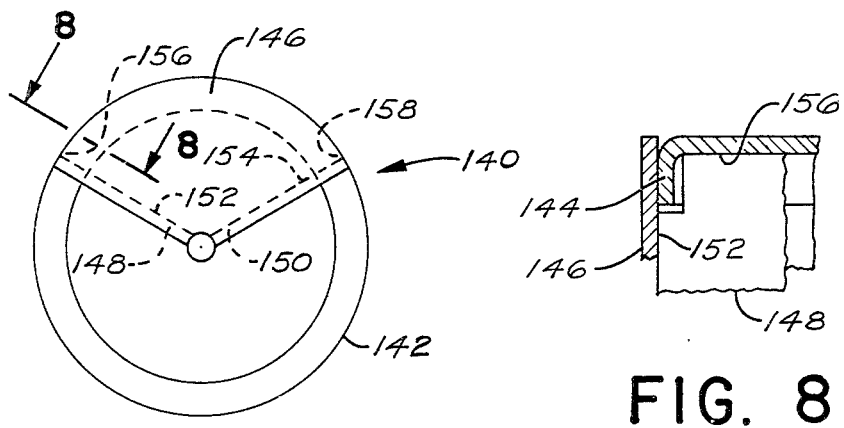
FIG. 7
FIG. 8

INVENTORS
WALTER L. HERMES
BY CHARLES JONES

*William V. Ebs*
ATTORNEY

United States Patent Office 3,486,326
Patented Dec. 30, 1969

3,486,326
EXHAUST GAS REACTOR
Walter L. Hermes, Cedar Grove, and Charles Jones, Hillsdale, N.J., assignors to Curtis-Wright Corporation, a corporation of Delaware
Filed Feb. 27, 1968, Ser. No. 708,714
Int. Cl. F01n 3/08, 7/04; F02b 75/10
U.S. Cl. 60—29      6 Claims

ABSTRACT OF THE DISCLOSURE

An exhaust gas reactor is provided with a plurality of inlets, an inner container wherein the oxidation of unburned materials in exhaust gases is facilitated, a casing about the container into which gases may flow from the container, and outlet means, all constructed and arranged to provide flow paths through the reactor such that substantially the same back pressure may be generated in each inlet.

BACKGROUND OF THE INVENTION

Our invention is directed to a system for reducing the quantity of unburned hydrocarbons and other deleterious substances in the exhaust gases of internal combustion engines. More particularly the invention is directed to an improved reactor wherein engine exhaust gases may be oxidized before being discharged into the atmosphere. The reactor of the invention is of the type shown in Patent 3,302,394 for Exhaust Manifold Reactor issued Feb. 7, 1967 to A. J. Pahnke et al., that is, of the type wherein exhaust fumes are oxidized in an inner container and such inner container is maintained at a high temperature by the flow of hot gases about it.

SUMMARY OF THE INVENTION

The invention is directed to providing an improved system for oxidizing the exhaust gases of an internal combustion engine in an exhaust reactor of the kind indicated.

It is an object of the invention to provide for the oxidation of the exhaust gases of an internal combustion engine in a reactor which is so arranged that substantially the same back pressure may be produced in each of a plurality of inlet conduits.

It is another object of the invention to provide an exhaust reactor wherein inlet conduits and baffle plates are symmetrically arranged with respect to exhaust conduit means in such fashion that substantially the same back pressure may be produced in each inlet conduit.

It is still another object of the invention to provide a reactor for internal combustion engine exhaust gases wherein an inner container forming a reaction chamber for exhaust gases is mounted for movement in an encasing structure so that the container may expand and move relative to such structure when heated.

It is yet another object of the invention to provide a reactor for internal combustion engine exhaust gases having by-pass conduit means for conveying exhaust gases from an inner container to an exposed portion of an intake manifold, and from the exposed portion of the intake manifold to exhaust conduit means connected with the container.

It is also an object of the invention to provide an efficient, low cost exhaust reactor which is constructed to promote the structural integrity of the entire unit.

Other objects and advantages of the invention will become apparent during a reading of the specification taken in connection with the accompanying drawings.

DESCRIPTION OF THE DRAWINGS

FIG. 5 is an end view showing a modified construction for the inner container of the exhaust reactor of FIG. 1;

FIG. 6 is a fragmentary sectional view taken on the plane of the line 6—6 of FIG. 5;

FIG. 7 is an end view showing another modified construction for the inner container of the exhaust reactor of FIG. 1;

FIG. 8 is a fragmentary sectional view taken on the plane of the line 8—8 of FIG. 7;

DETAILED DESCRIPTION OF THE INVENTION

Figure 1:
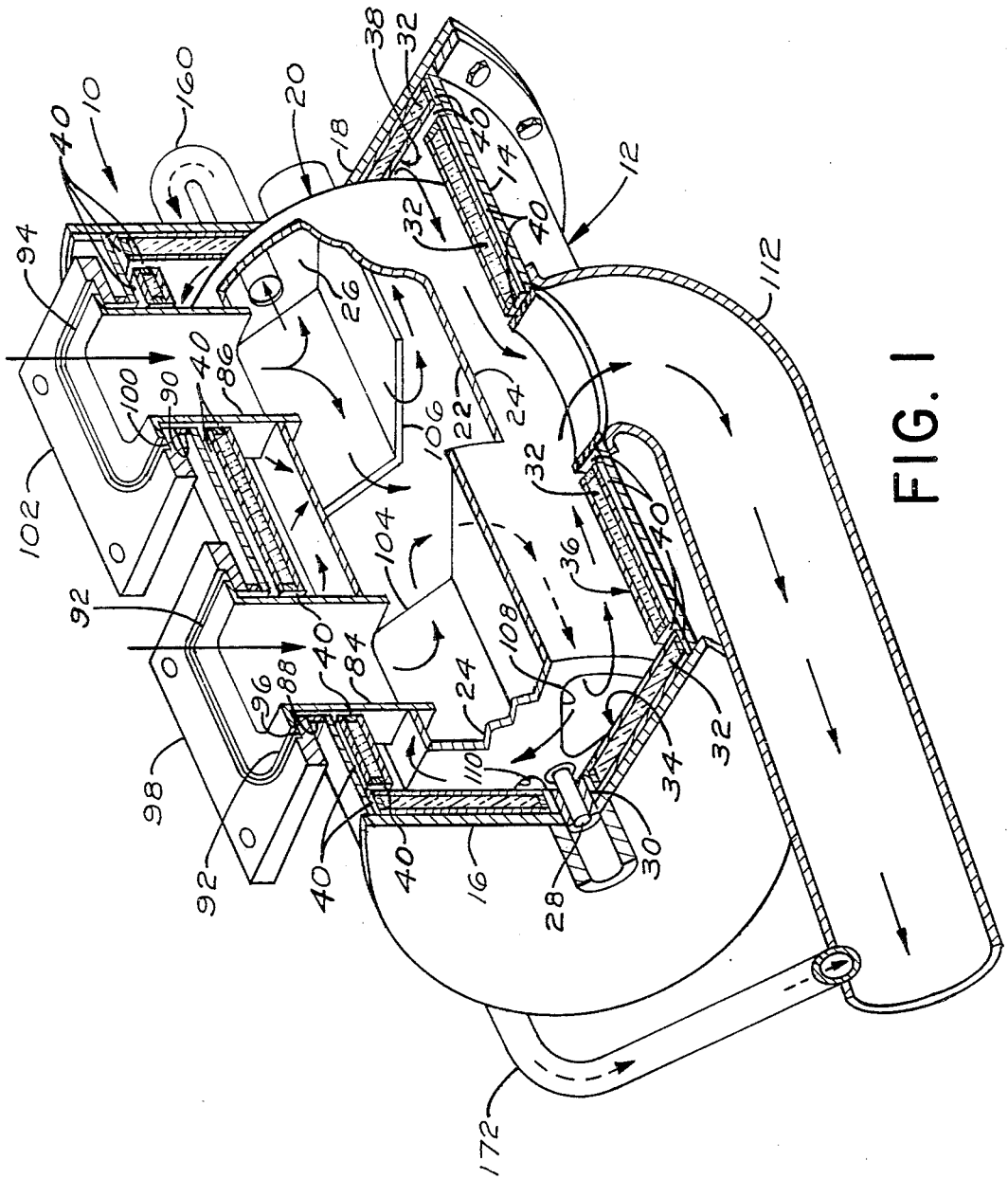
FIG. 1 is a perspective view partially in section showing the exhaust reactor of the invention.

Referring to the drawings, and in particular to FIG. 1, reference character 10 designates the exhaust reactor of the invention. Such reactor includes an outer encasing structure 12 formed as by peripheral wall 14 and end walls 16 and 18. Within encasing structure 12 there is an inner container 20 formed as by peripheral wall 22 and end walls 24 and 26. Preferably the encasing structure 12 and inner container 20 are cylindrical as shown, however, they may be also formed to an oval configuration or have any other suitable shape.

Inner container 20 is mounted within encasing structure 12 with all of its walls spaced from the walls of structure 12 to permit gases in the reactor to flow about and heat the container. The inner container 20 is mounted at opposite ends in the encasing structure 12 in such a way as to accommodate thermal expansion of the container in an axial direction relative to structure 12. As shown, a pin 28 at one end of the container is secured to end wall 24 and slidably mounted in a bushing 30 that is secured to the structure 12. The container is similarly mounted at its other end in encasing structure 12. Damage to the reactor due to expansion of the container in an axial direction at high temperatures is therefore prevented.

The walls of encasing structure 12 may be insulated with fibrous or foamed insulation 32 which is encapsulated in metal sheathing to prevent erosion of the insulating material by high velocity hot gases and the induction of particles of the material into the engine. Insulating units 34, 36 and 38 which are constructed in this manner are shown in FIG. 1. Such insulating units should be dimensioned to provide the gaps indicated at 40 permitting the units to expand freely when subjected to high temperatures.

Figure 2:
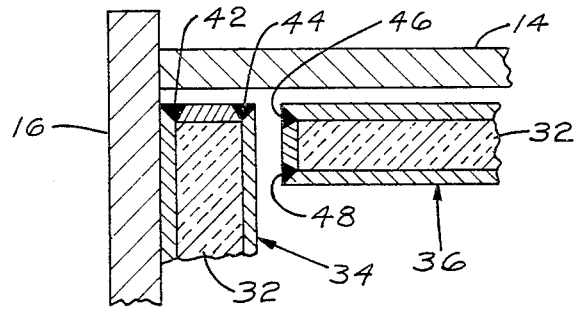
FIG. 2 is a fragmentary enlarged sectional view showing the construction of encapsulated insulation used in the exhaust rotor of FIG. 1.

Insulating units 34, 36 and 38 may be assembled as illustrated in FIG. 2, that is, by welding or brazing the encasing sheathing as, for example, at 42, 44, 46 and 48. Alternately, the insulating units may be assembled and arranged in the reactor container as shown in FIGS. 3 and 4 to accommodate differential expansion of the encasing sheathing of each of the encapsulated units and so prevent the joints at which the units are assembled from rupting.

Figure 3:
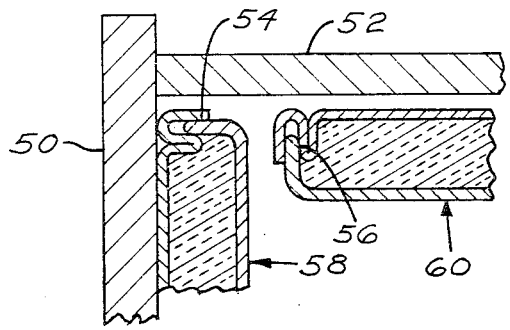
FIG. 3 is a fragmentary sectional view showing a modified construction for the encapsulated insulation.
Figure 4:
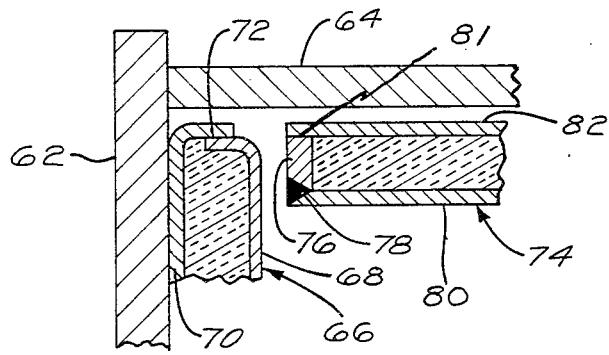
FIG. 4 is a fragmentary sectional view showing still another modified construction for the encapsulated insulation.

In the arrangement of FIG. 3 wherein reference characters 50 and 52 designate and end wall and peripheral wall, respectively, of an inner container according to the invention, the insulating units are assembled with rolled seams which form expandable joints such as shown at 54 and 56 on units 58 and 60 respectively, and all units are disposed in the container with the joints adjacent the container walls. Such construction and arrangement permits both relative radial and relative axial expansion of the walls of the units. A similar result is achieved in the arrangement of FIG. 4 showing an end wall and peripheral wall of an inner container at 62 and 64 respectively. In such arrangement insulating units adjacent end wall of the container, such as the unit 66 which is formed by encasing shells 68 and 70, are assembled with the shells in sliding contact as at 72. The other insulating unit 74 has its end walls such as the end wall 76 welded or brazed as at 78 to an inner encasing shell 80 and in sliding contact as at 81 with an outer encasing shell 82.

Instead of providing the encapsulated insulating units described, foam insulation may be sprayed onto the inside surface of the walls of the encasing structure 12 and coated with a ceramic material to prevent erosion and the induction of particles of the insulation into the engine.

Reactor 10 includes a plurality of inlet conduits such as the inlet conduits 84 and 86, each of which is to be similarly connected in the case of a conventional multi-cylinder internal combustion engine to the same number of cylinders (one or more), and in the case of a multi-unit rotary combustion engine (an example of which is shown in Patent 3,289,650 of M. Bentele et al. issued Dec. 6, 1966) to the same number of engine exhaust ports (one or more). The conduits 84 and 86 are secured to peripheral wall 22 of inner container 20 as shown. Such conduits admit engine exhaust gases (which may be mixed with auxiliary air) to a reaction chamber formed by the container 20. The inlet conduits are mounted to permit them to move with container 20 upon expansion of the container in an axial direction relative to the encasing structure 12. As shown, the inlet conduits extend through openings in structure 12 having walls 88 and 90 which are spaced from the conduits, and said conduits have flanges 92 and 94 that are slidable in collars suitable for mounting the reactor on an engine. As illustrated, flange 92 on conduit 84 is slidable in a recess 96 formed in a mounting collar 98, and flange 94 on conduit 86 is slidable in a recess 100 formed in a mounting collar 102.

The container 22 includes a plurality of angled baffle plates, such as the plates 104 and 106, each of which is located opposite an inlet conduit. Baffle plates 104 and 106 are secured flush against container end walls 24 and 26 respectively, and each such wall effectively blocks the flow of gas over the adjoined plate in the direction of the wall. Hot gases entering the container, through inlet conduits 84 and 86 impinge on plates 104 and 106, respectively, and are redirected as shown in FIG. 1. The gases flow around and under the plates to openings 108 and 110 in end wall 24 and to similar openings (not visible in the drawing) in the other end wall. The gases escape from the openings in the end walls into the space between the container 20 and encasing structure 12, flow about the container 20 and then into an exhaust conduit 112 which is secured to the encasing structure 12. The gases flowing about the container 20 maintain the gaseous contents of the container at a high temperature and thereby help promote the oxidation of exhaust fumes within the container.

It is an important feature of the invention that the reactor parts are so constructed and arranged as to provide flow paths through the device such that the resistance offered to the flow of gases entering the container through either inlet conduit is substantially the same, and substantially the same back pressure may therefore be produced in each inlet conduit to assure efficient and smooth engine performance. Preferably, like inlet conduits and like baffle plates are symmetrically arranged with respect to exhaust conduit means to provide similar flow paths through the reactor for gases entering each inlet conduit. The reactor parts may be arranged as in the manner of FIG. 1, for example, wherein the inlet conduits 84 and 86, and the baffle plates 104 and 106 are shown symmetrically disposed with respect to exhaust conduit 112. Preferably, the baffle plates are coated with a ceramic heat resistant material on sides facing the inlet conduits to prevent erosion of the plates by impinging hot gases.

The reactor inner container may be modified at each end as in FIGS. 5 and 6, or as shown in FIGS. 7 and 8, in order to minimize distortion due to thermal expansion. A modified container shown in FIGS. 5 and 6 and designated by reference character 114 includes peripheral wall or shell 116 and an end closure sector 118 having an arcuate marginal portion 120 which overlaps the shell but is not welded or otherwise affixed thereto. Baffle plates 122 and 124 are welded along axially extending edges at 126 and 128 to the shell and at their ends along edges 130 and 132 to the sector 118. The baffle plates 122 and 124, and ribs 134 and 136 which are affixed to the shell and which may take the form of the baffle plates are affixed to a pin 138 that is used to slidably mount the container within the reactor. The baffle plates and ribs are symmetrically disposed around the inside of the shell 116 as shown. In the construction of FIGS. 7 and 8 the container designated by reference character 140 includes a shell 142 having a flanged end portion 144 and a sector 146 which overlies the flanged portion 144. The sector 146 is not secured to the shell but is welded to baffle plates 148 and 150 at 152 and 154. The baffle plates are welded at 156 and 158 to the shell. With the described modified constructions substantial freedom is afforded for differential expansion of container parts and therefore only slight distortion at high temperatures is possible.

Figure 9:
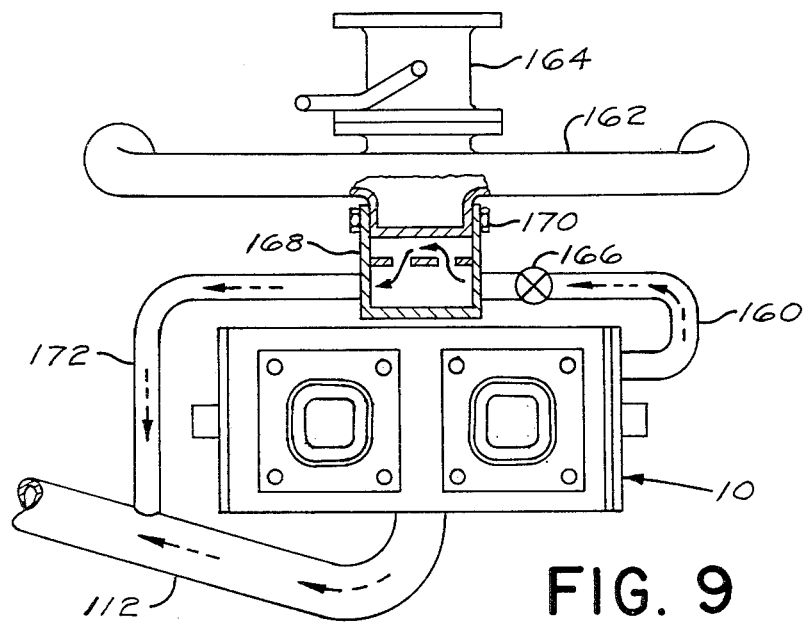
FIG. 9 is a schematic view showing the exhaust reactor of the invention and an engine intake manifold which is heated by gases from the reactor.

A by-pass line 160 (see FIG. 9) may be provided for conveying hot gases from the container 20 to an engine intake manifold 162 at low engine temperatures to thereby heat the manifold and so preheat the fuel-air mixture from the engine carburetor 164 before induction into the engine cylinders. In this way the operation of the engine may be rendered smoother and more efficient just after starting when the engine is warming up. Also, preheating of the air-fuel mixture at such time results in a reduction in the quantity of unburned combustion products discharged from the engine cylinders and ultimately from the exhaust reactor 10. The flow of hot gases through line 160 is conveniently controlled by a thermostatically operated valve 166 which is normally open at low engine temperatures but which is moved to a closed position as the engine warms up. As shown in FIG. 9 the hot gases flow from the reactor through line 160 (when valve 65 is open) and into housing 168 which is secured at 170 to the intake manifold 162 and wherein the gases heat the manifold. From the housing 168 such gases flow into line 172 and then into exhaust conduit 112 with which the line 172 connects.

Line 160 may be connected to the container 20 through end wall 26 as indicated in FIG. 1, or it may be connected to the container at any other suitable locations. The symmetry of the flow paths of gases through the reactor is slightly disturbed during the warm-up period of an engine when line 160 is connected to one end of the container as through end wall 26 because of the flow of some gas into the line. However, the required flow into the by-pass conduit means between the container and exhaust conduit 112 for heating the intake manifold is slight, and with the by-pass conduit means designed for such flow, back pressure in the inlet conduits is not substantially affected. Line 160 might, for example, also be connected to the container between baffle plates 104 and 106 at an equal distance from each in which case the symmetry of the flow paths through the reactor would not be disturbed at all.

Figure 14:
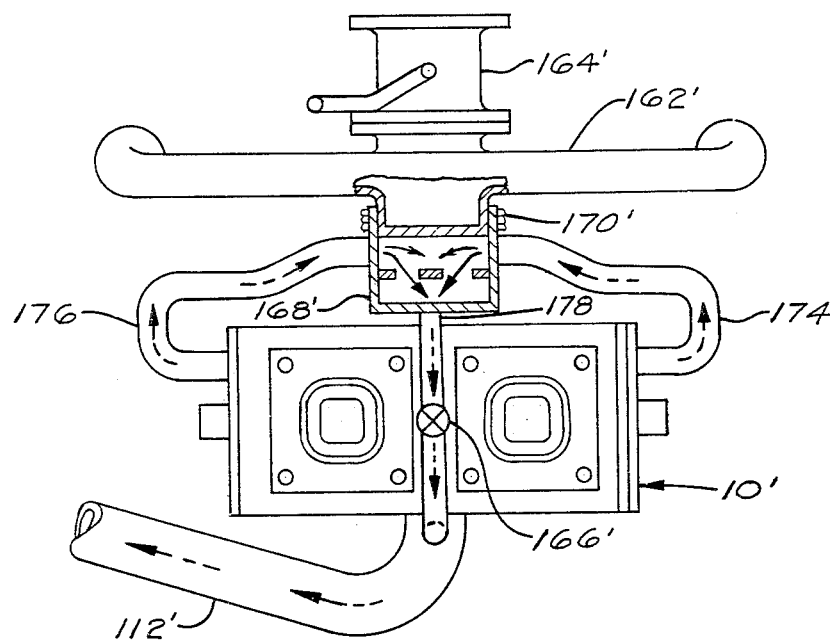
FIG. 14 is a schematic view similar to FIG. 9 showing a modified arrangement wherein an engine intake manifold is heated by gases from the exhaust reactor of the invention.

The symmetry of the flow paths of gases through the reactor may also be preserved in the alternate arrangement of FIG. 14 wherein parts similar to those in FIG. 9 are denoted with reference characters which are like the reference characters of FIG. 9 but have a prime mark (′) added thereto. In such arrangement two by-pass lines 174 and 176 are provided (instead of the one line 160 of FIG. 9) between the reactor container and the housing 168′ which is secured to the manifold 162′ and wherein gases from the reactor heat the manifold. Such lines 174 and 176 are connected to opposite ends of the reactor inner container and to the opposite sides of housing 168′ as shown. A line 178 which includes thermostatically controlled valve 166′ connects the housing 168′ with the exhaust line 112′.

Figure 10:
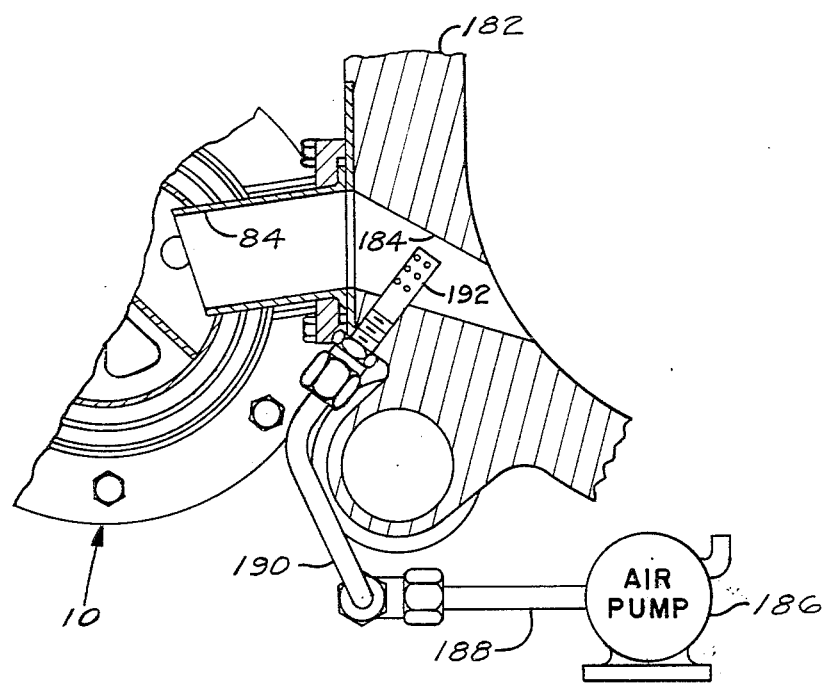
FIG. 10 is a fragmentary cross-sectional view showing the exhaust reactor connected to a rotary combustion engine and air injection means.

In an engine exhaust system incorporating the reactor 10, it is generally desirable to introduce fresh air to promote oxidation within the reactor, although it is possible in the case of an engine operating on a lean gas mixture to eliminate such auxiliary air or at least reduce the amount of air added. When fresh air is added it is preferably introduced upstream from the inlet conduits rather than directly into the inlet conduits so that the fresh air and exhaust fumes can mix before entering the reactor. Fresh air may, for example, be introduced into the exhaust ports of a rotary combustion engine to which the reactor 10 might be connected. In the arrangement of FIG. 10 wherein the reactor 10 is shown secured to a rotary combustion engine 182 with inlet conduit 84 in direct communication with an engine exhaust port 184, fresh air from an air pump 186 is supplied to the port through lines 188 and 190 and perforated injection nozzle 192. In such arrangement the other reactor inlet should directly communicate with a second exhaust port of the engine (it being understood that such engine 182 is a two unit type of the kind shown, for example, in Patent 3,289,650 referred to hereinbefore, and that each unit includes one exhaust port with which one of the reactor inlet conduits may connect), and air should be supplied to the second exhaust port as in the manner of FIG. 10 from the air pump 186 through additional air supply lines. The air supply lines may be wrapped around or passed through the reactor outlet to preheat the auxiliary air and so prevent the engine exhaust gases from being cooled by the air to the point where oxidation of the exhaust fumes is substantially reduced.

Figure 11:
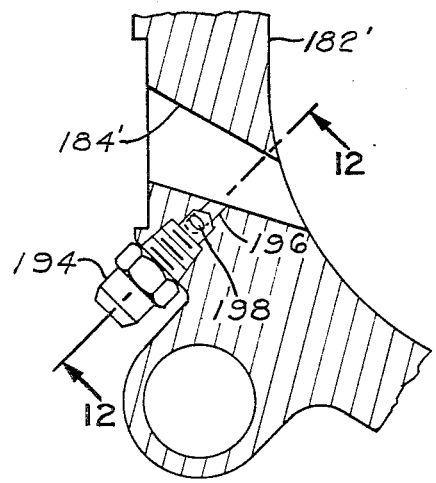
FIG. 11 is a fragmentary cross-sectional view of a rotary combustion engine showing a modified arrangement for introducing auxiliary air into the engine exhaust gases.
Figure 12:
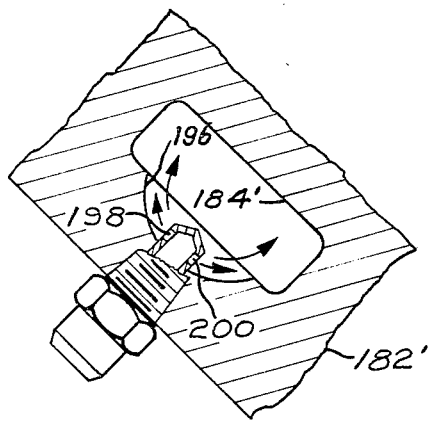
FIG. 12 is a fragmentary sectional view taken on the plane of the line 12—12 of FIG. 11.

An alternate arrangement for introducing auxiliary air into the exhaust ports of a rotary combustion engine is shown in FIGS. 11 and 12 wherein parts corresponding to those shown in FIG. 10 are denoted by like reference characters having a prime mark (′) added thereto. In such alternate arrangement an air injection nozzle 194 extends into an arcuate slot 196 which communicates with the engine exhaust port 184′. Air is injected through nozzle openings 198 and 200 into the slot which causes the injected air to flow to the sides of the exhaust port 184′ where it mixes with the engine exhaust fumes. Since the auxiliary air is introduced into the exhaust gas flow at the sides of the exhaust port, the core of the exhaust gas flow is not disturbed and the air can mix gradually with the exhaust fumes. It is also an advantages of the arrangement of FIGS. 11 and 12 that there is no relatively cold injection nozzle projecting into the exhaust gas stream and tending to quench the oxidation of unburned hydrocarbon and other deleterious materials.

Figure 13:
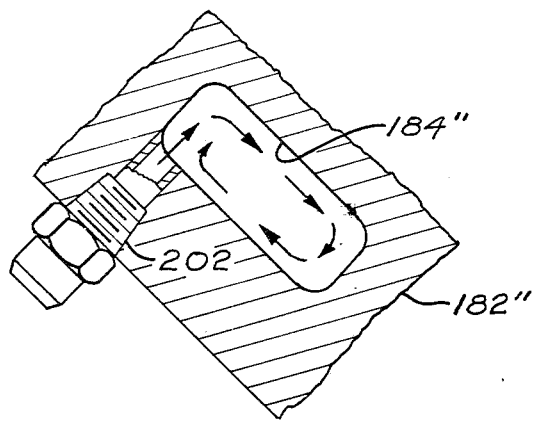
FIG. 13 is a fragmentary view similar to the view of FIG. 12 showing another modified arrangement for introducing auxiliary air into the engine exhaust gases.

A second alternate arrangement for introducing air into the exhaust ports of a rotary combustion engine is shown in FIG. 13 wherein parts corresponding to those shown in FIG. 10 are denoted by like reference characters having a double prime mark (″) added thereto. In the arrangement of FIG. 13 air is supplied through an injection nozzle 202 to one side of the engine exhaust port 184″ so that it flows into the port tangentially to the outer periphery of the exhaust gas stream. With the air supply pressure sufficient to inject the air at an adequate velocity, the air flows tangentially around the periphery of the exhaust port and mixes only gradually with the engine exhaust gases until the entire flow reaches the reactor (where the sudden turn at the baffle and elsewhere assures complete mixing). The central core of the exhaust stream in port 184″ therefore remains hot and oxidation of the unburned hydrocarbons and other materials can therefore take place in the port and thereafter in the reactor without interruption.

In an engine exhaust system for a conventional internal combustion engine, auxiliary air is conveniently introduced into suitable conduit means connecting the engine cylinders with the exhaust reactor 10.

Although the engine exhaust system of the invention has been set forth herein in some detail and a number of modifications have been shown and described, it will be understood that the invention is not limited to the specific details described and illustrated nor to the particular modifications referred to, but that various changes and modifications may be made by those skilled in the art without departing from the spirit and scope of the invention as the same will now be understood by those skilled in the art.

What is claimed is:

1. An exhaust reactor for a fuel combustion engine comprising
  (a) a container,
  (b) a plurality of conduits connected to the container for admitting engine exhaust gases and air thereto,
  (c) the container having one or more outlet openings through which exhaust and air mixture may pass,
  (d) baffle means in the container for lengthening the path of flow of the gases through the container,
  (e) an encasing structure about the container, and spaced from the container to permit gases passing from the container to flow about the container,
  (f) exhaust conduit means in said encasing structure to conduct gases from said space between said container and encasing structure, and
  (g) encapsulated insulation disposed adjacent the inside surfaces of the encasing structure to minimize heat loss through the encasing structure from the gases flowing about the container,
  (h) said encapsulated insulation comprising a plurality of insulating units each of which includes a core of insulating material and relatively movable encasing shell pieces.

2. The exhaust reactor of claim 1 wherein each insulating unit includes a rolled seam joint between the encasing shell pieces.

3. The exhaust reactor of claim 1 wherein each insulating unit includes a sliding joint.

4. An exhaust reactor of claim 1 wherein said container has a cylindrical peripheral wall and wherein each of said one or more openings in said container is defined by the end of the peripheral wall and a gas blocking sector at the end of the peripheral wall, the sector being affixed only to the baffle means and slidable relative to the container peripheral wall.

5. The exhaust reactor of claim 1 wherein the container has a cylindrical peripheral wall and wherein each of said openings is defined by the end of the peripheral wall and a sector plate disposed at said end of the peripheral wall and affixed to the baffle means, a plurality of support struts extending from the cylindrical peripheral wall to said sector and arranged symmetrically with the baffle means.

6. An exhaust reactor comprising a container, a plurality of conduits connected to the container for emitting engine exhaust gases thereto, the container having a cylindrical peripheral wall and flanged end portions forming openings at each end through which the engine exhaust gases may escape, baffle means in the container for lengthening the paths of flow of gases through the container, a gas blocking sector at each end of the peripheral wall, the sectors being slidably disposed on the flange end portions of the cylindrical wall and affixed to said baffle means, an encasing structure surrounding the container, and spaced from the container to permit gases escaping through said openings to flow about the container, and exhaust conduit means through which gases may escape from the space between said container and encasing structure, the baffles being arranged in the container to provide flow paths for gases through the reactor.

References Cited

UNITED STATES PATENTS

| | | | |
|---|---|---|---|
| 3,210,161 | 10/1965 | Soltau | 60—30 |
| 3,247,666 | 4/1966 | Behrens | 60—30 |
| 3,287,900 | 11/1966 | Soltau | 60—30 |
| 3,302,394 | 2/1967 | Pahnke | 60—30 |
| 3,413,803 | 11/1968 | Rosenlund | 60—30 |

MARK M. NEWMAN, Primary Examiner

DOUGLAS HART, Assistant Examiner